United States Patent
Gmeiner et al.

[19]

[11] Patent Number: 5,948,367
[45] Date of Patent: Sep. 7, 1999

[54] DEVICE FOR CONVEYING METERED QUANTITIES OF AT LEAST TWO FREE-FLOWING COMPONENTS OF A REACTIVE COMPOUND

[75] Inventors: Paul Gmeiner, Lieli, Switzerland; Rolf Altemeier, Dettighofen, Germany

[73] Assignee: Micafil Vakuumtechnk AG, Zurich, Switzerland

[21] Appl. No.: 08/852,740

[22] Filed: May 7, 1997

[30] Foreign Application Priority Data

May 9, 1996 [DE] Germany .............................. 196 18 591

[51] Int. Cl.$^6$ ...................................................... C08F 2/00
[52] U.S. Cl. ............................... 422/111; 222/52; 222/71; 222/92; 222/133; 222/135; 222/632; 422/133
[58] Field of Search ..................................... 422/111, 110, 422/133; 222/52, 71, 92, 133, 135, 632

[56] References Cited

U.S. PATENT DOCUMENTS 5,317,928  6/1994  Young .

FOREIGN PATENT DOCUMENTS

| 0248514 | 12/1987 | European Pat. Off. . |
| 2158118 | 6/1973 | France . |
| 2910798C2 | 2/1981 | Germany . |
| 3128666C2 | 1/1983 | Germany . |
| 3134911A1 | 3/1983 | Germany . |
| 3019987C2 | 9/1986 | Germany . |
| 3611728C1 | 4/1987 | Germany . |
| 8805166 U | 11/1988 | Germany . |
| 63-50726 | 3/1988 | Japan . |
| WO88/04225 | 6/1988 | WIPO . |

OTHER PUBLICATIONS

Instrumentation,Measuring and Testing, p. 13, "Liquids dosimeter".
"Mischtechnik", PLASTverarbeiter 38, 1/87, pp. 80–82.

*Primary Examiner*—Timothy McMahon
*Attorney, Agent, or Firm*—Burns, Doane, Swecker & Mathis, L.L.P.

[57] ABSTRACT

The device serves to meter at least two free-flowing components and to convey metered quantities of the components into a mixer in which a reactive compound is formed from the metered quantities. For each component the device contains, as metering and conveying means, in each case at least one pump, a flow meter and a pressure vessel. The pressure vessel is subdivided by a flexible diaphragm into a first part-volume, which in each case receives one of the components, and a second part-volume which can be acted upon by incompressible fluid. When a starting component containing abrasive substances is used, to avoid sedimentation of the abrasive substances during metering and conveying, the pressure vessel which receives the abrasive component is designed and arranged in such a way that the abrasive component fed into its first part-volume rests on the flexible diaphragm.

14 Claims, 2 Drawing Sheets

DEVICE FOR CONVEYING METERED QUANTITIES OF AT LEAST TWO FREE-FLOWING COMPONENTS OF A REACTIVE COMPOUND

BACKGROUND OF THE INVENTION

1. Field of the Invention

The invention relates to from a device for conveying metered quantities of at least two free-flowing components of a reactive compound.

2. Discussion of Background

Here the invention makes reference to a device for metering at least two free-flowing reaction components into a mixing chamber, as is described in WO 88/04225. For each component, this device contains in each case at least one container volume with a flexible displacing element designed, for example, as a bellows or as a diaphragm. The displacing element subdivides the container volume into a component volume and a hydraulic volume. Prior to metering, some of the component is fed from a supply container, which is acted upon by initial pressure, via a shutoff valve into the component volume of the pressure vessel. The shutoff valve to the supply container is then closed. During subsequent metering, the displacing element is acted upon by a hydraulic flow, which can be regulated in size and time by a controller/regulator, and metered quantities of the component are thus fed into the mixing chamber. In this case, however, sedimentation of any abrasive substances which may be provided in the component cannot be reliably ruled out.

SUMMARY OF THE INVENTION

Accordingly, one object of the invention, is to provide a novel device of the type mentioned at the beginning, in which sedimentation of abrasive substances contained in an abrasively acting component is very reliably avoided.

In the device according to the invention, during metering at least the free-flowing component filled with abrasive substances rests on a flexible diaphragm. This diaphragm delimits two part-volumes in a pressure chamber, one of which part-volumes serves to receive the component and another to receive an incompressible fluid. When the component is conveyed from a supply container into the pressure vessel and when the component is conveyed from the pressure vessel into a mixer, the diaphragm is continuously deformed. The component resting on the diaphragm is thus constantly moved and sedimentation of the abrasive substances during the conveying and metering of the component is thus largely avoided.

If the other one of the at least two components also contains abrasive substances, sedimentation of the abrasive substances is avoided in a corresponding manner by having the component rest on the diaphragm of a further pressure vessel of the metering device. Naturally, this also applies to further abrasive components used in the device according to the invention.

A vertical arrangement of the part-volume which receives the abrasive component above the part-volume which receives the incompressible fluid and a spherical design of the pressure chamber are to be preferred, since a particularly effective movement of the component resting on the diaphragm and particularly high operating reliability are then ensured. The diaphragm is then arranged essentially horizontally.

However, it is also possible to arrange the diaphragm inclined at an acute angle relative to the horizontal plane or even vertically, since a force is then likewise exerted on the abrasive component by the movement of the diaphragm during operation of the device, and the sedimentation of the abrasive filler materials is therefore avoided.

The pressure vessel is advantageously formed by two shells curved in opposite directions. The diaphragm can then be clamped in a simple manner between the two shells. The diaphragm can then be designed in such a way that it is placed during filling of the pressure vessel against the curvature of a first one and during metering against the curvature of the second one of the two shells without it being mechanically overloaded in the process. Monitoring of the diaphragm for overstretching is then not required.

Furthermore, the device according to the invention is basically also distinguished by high availability with little maintenance outlay. This is due primarily to the fact that the device basically requires neither conveying and metering pumps nor quick-acting valves in areas in which it feeds abrasive or chemically aggressive components. The metering can take place solely by means of the incompressible fluid.

The metering can, however, be controlled directly by monitoring the volume flow of the respective starting component in the conveying path between the pressure vessel and the mixer, for example by means of a flow meter. In this case, by measuring the temperature, the precise mass of the starting component flowing through can be determined in a simple manner. Compared to the abovementioned metering in which the volume flow of the incompressible fluid is monitored, this metering has the advantage that the quantity of the component fed into the mixer can be measured directly and cannot be falsified by any defect in the pressure vessel or a pump.

Particularly high operating reliability results if both the mass flow of the abrasive component and the volume flow of the fluid are monitored.

Since no great pressure differences occur in the two part-volumes of each of the pressure vessels, very large diaphragms can be used. As a consequence thereof, the valves provided in the device according to the invention only need to perform a very low number of switching operations depending on the quantities of component conveyed into the pressure vessels. The valves can therefore be designed as slowly switching valves with double seals which are distinguished by an extremely long service life and being largely maintenance free. Typical switching times are 0.1 s to 1 s.

By applying a vacuum to the part-volumes of the pressure vessels which receive the incompressible fluid, the diaphragms can be pulled back particularly quickly after metering. At the same time, this ensures that the filling of the pressure vessel with the abrasive component is maintained even in the case of a supply container for the abrasive component being kept only under vacuum. Furthermore, the fluid is degassed by the vacuum. As a result, the incompressibility of the fluid is not impaired by dissolved gases, and the metering accuracy is improved during metering with the fluid. By applying overpressure to the supply container, the inflow velocity of the components can additionally still be increased.

If the incompressible fluid emerging from the pressure vessel is fed into an evacuable vessel in which it is pressurized during metering, feed pumps to the pumps which feed the incompressible fluid into the pressure vessels are not required. At the same time, no metering errors can occur when the incompressible fluid is fed in, since the suction lines of the pumps are always filled with incompressible fluid.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein the two figures each show a basic circuit diagram of two preferred embodiments of the device according to the invention.

DESCRIPTION OF THE PREFERRED EMBODIMENTS

Figure 1:
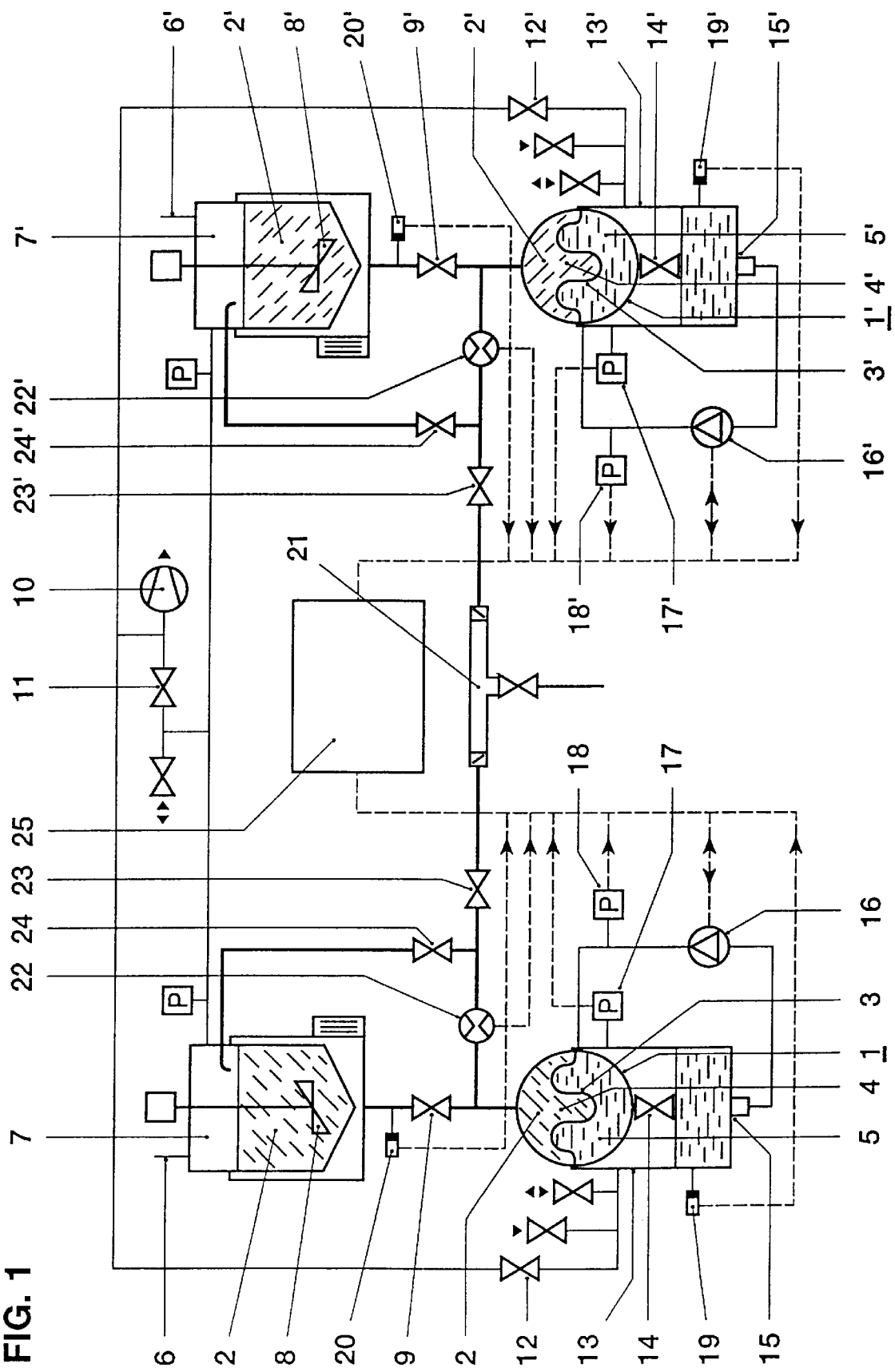
Figure 2:
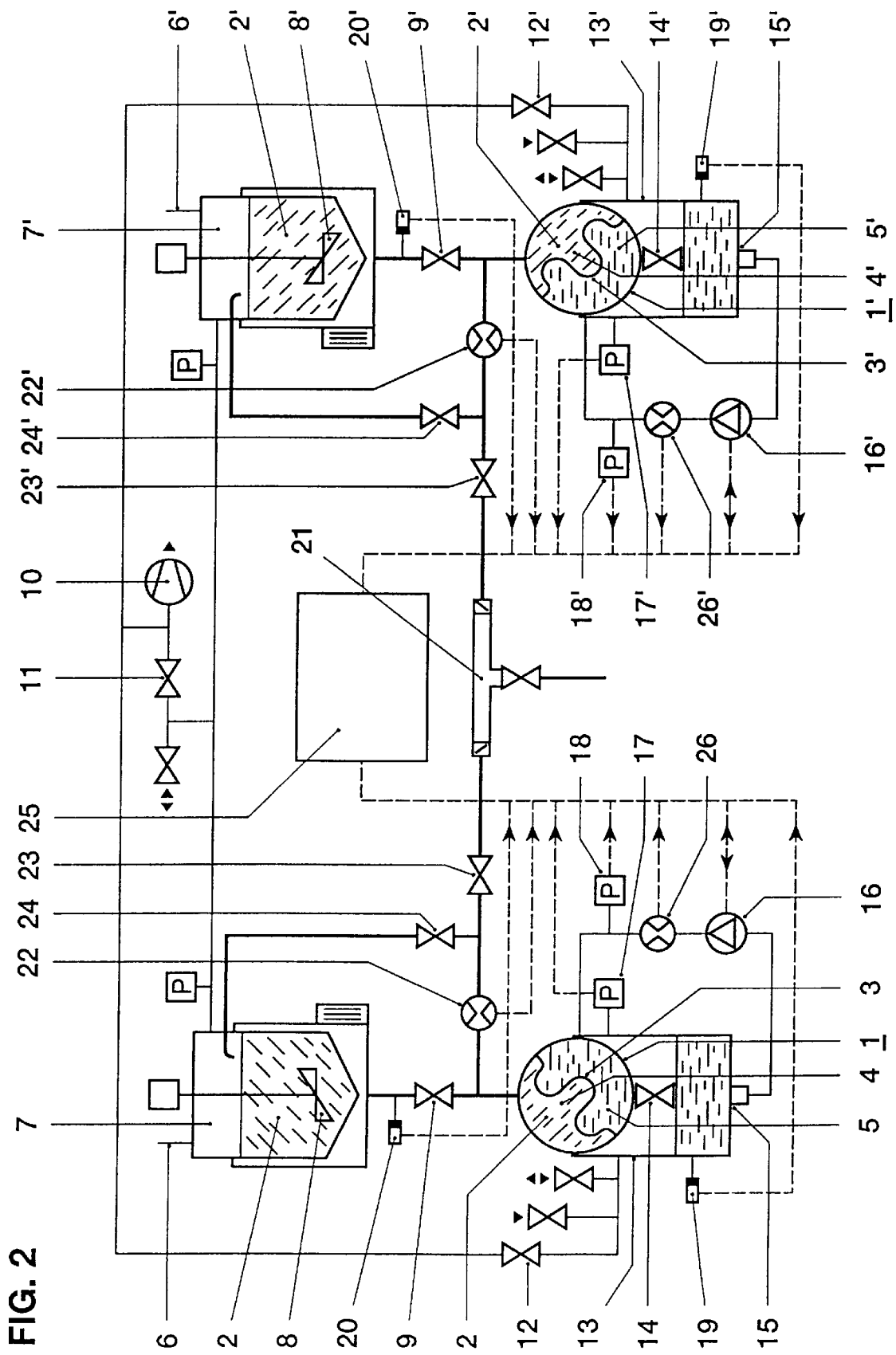

Referring now to the drawings, wherein like reference numerals designate identical or corresponding parts in both FIGS. 1 and 2, the reference numerals 1 and 1' refer to two containers designed to be pressure-resistant and vacuum-resistant to receive in each case one of two liquid starting components 2, 2' of a casting resin compound. The starting component 2 may contain, for example, an epoxy resin and a filler material as constituent parts, the starting component 2' for example a curing agent and an accelerator. The pressure vessel 1 or 1' is advantageously of essentially spherical design and in each case formed by two shells curved in opposite directions, between which a flexible diaphragm 3 or 3' is clamped in each case. The diaphragm 3 or 3' subdivides the pressure chamber 1 or 1' in each case into a part-volume 4 or 4', which receives the starting component 2 or 2', and a part-volume 5 or 5' which can be acted upon by an incompressible fluid, such as preferably hydraulic oil. The diaphragm 3 or 3' is designed in each case in such a way that it can be placed during filling of the pressure vessel 1 or 1' with the component 2 or 2' against one of the two shells and during removal of the component 2 or 2' during a metering operation against the other one of the two shells without becoming overstretched in an inadmissible manner during the process.

After an inlet 6, 6' controlled by a valve (not illustrated) has been opened, in each case one of the two starting components 2, 2' can be introduced as a whole or in the form of its constituent parts into a supply vessel 7 or 7' and—if required—heated there and homogenized or degassed by an agitator 8 or 8'. An outlet provided in the bottom of the supply vessel 7 or 7' is connected via a valve 9 or 9' to the part-volume 4 or 4' of the pressure vessel 1 or 1' containing the component 2. A vacuum pump 10 can be connected via a valve 11 to the supply vessels 7 and 7' and via a valve 12 or 12' to an evacuable vessel 13 or 13' onto which the pressure vessel 1 or 1' can be fitted in a vacuum-tight manner.

The evacuable vessel 13 or 13' is at least partially filled with incompressible fluid below an opening formed by the connection line to the vacuum pump and surrounds a valve 14 or 14' arranged in the bottom of the pressure vessel 1 or 1'. A further opening 15 or 15' is provided in the bottom of the evacuable vessel, which opening is operatively connected to a suction nozzle of a pump 16 or 16' which conveys the incompressible fluid into the part-volume 5 or 5' of the pressure vessel 1 or 1'. A pressure gage 17 or 17' determines in each case the pressure in the evacuable vessel 13 or 13'. Reference numeral 18 or 18' denotes a pressure gage which determines the pressure of the incompressible fluid in the connection line, containing the pump 16 or 16', to the part-volume 5 or 51 and thus also in the pressure vessel 1 or 1'. Reference numerals 19 or 19' and 20 or 20' refer to temperature gages which give the temperature of the fluid in the evacuable vessel 13 or 13' and of the component 2 or 2' in the connection line from the supply vessel 7 or 7' to the pressure vessel 1 or 1' and thus also in the supply vessel 7 or 7' and in the pressure vessel 1 or 1'.

Branching off from the connection line between the valve 9 or 9' and the pressure vessel 1 or 1' is a connection line to a mixer 21 which produces a reactive casting resin compound from the two starting components 2 and 2'. Arranged in this branching off connection line are, in sequence, a flow meter 22 or 22', in particular one on the basis of a Coriolis counter, and a valve 23 or 23'. A further valve 24 or 24' is arranged in a connection line between a volume of the supply vessel 7 or 7', kept free from starting component 2 or 2', and the connection line between the flow meter 22 or 22' and the valve 23 or 23'.

This device functions as follows: With the inlets 6, 6' closed, the valves 9, 9', 23 and 23' closed and the valves 11, 24 and 24' open, firstly all those parts of the device are evacuated which are provided for feeding the starting components 2 and 2'. The inlets 6, 6' are then opened, and the supply vessels 7, 7' with the assigned starting components 2, 2' or the constituent parts of the assigned starting components 2, 2' are loaded under a vacuum. The inlets 6, 6' are then closed, and the starting components 2, 2' are homogenized and degassed by actuating the agitators 8, 8'. Emerging gases and vapors are removed by the vacuum pump 10. In this case, by heating the supply vessels 7, 7', the starting components 2, 2' are heated to a desired processing temperature indicated by the temperature gage 20, 20'.

As soon as the components 2, 2' have been sufficiently prepared, the agitators 8, 8' are switched off, and the valve 11 is closed. The valves 9, 9' are opened, and the components 2, 2' are conveyed into the part-volumes 4, 4' of the pressure vessels 1, 1' under the effect of pressurized gas which can be fed into the supply vessels 7, 7', for example via the inlets 6, 6'. As an alternative or in addition, a vacuum can be generated by opening the valves 12, 12', 14, 14' in the evacuable vessels 13, 13' and the pressure vessels 1, 1', and the diaphragms 3, 3' can thus be guided downward. In this case, the component 2 or 2' passes out of the supply vessel 7 or 7' into the part-volume 4 or 4' of the pressure vessel 1 or 1'. At the same time, incompressible fluid is displaced out of the part-volume 5 or 5' and is conveyed via the open valve 14 or 14' into the vessel 13 or 13', where it is effectively degassed under a vacuum. The gas-free fluid has a particularly high incompressibility and is advantageously suitable as a metering means. During this time the components 2, 2' fed out of the supply vessels 7, 7' always rest on the deforming diaphragms and are therefore subjected to constant movement.

When the part-volumes 4 and 4' have been sufficiently filled with component 2 and 2', the valves 9, 9', 12, 12' and 14, 14' are closed, and the vessels 13, 13' are aerated and, if appropriate, also subjected to overpressure. With the pump 16 or 16' running, fluid is then sucked out of the vessel 13 or 13' via the opening 15 or 15'. A check is firstly made to see whether the metering determined by the stroke and the rotational speed of the pump 16 or 16' is correct. For this purpose, the valve 24 or 24' can be opened, and the starting component 2 or 2' is then fed from the pressure vessel 1 or 1' via the flow meter 22 or 22' and the open valve 24 or 24' into the supply vessel 7 or 7'. Using the data measured by the flow meters 22 and 22', the metering is then checked and, if appropriate, corrected by changing the rotational speed of the pump 16 or 16'.

A particularly good metering accuracy is achieved by recording the temperature of the starting component 2 or 2' using the temperature gage 20 or 20' and taking it into account when determining the mass of the metered quantity of component. For example, at high temperatures, the density of the starting component 2 or 2' is reduced compared to its density at room temperature. The desired mass of starting component 2 or 2' is then achieved by raising the volume of fluid. In this case, a controller/regulator 25 records the output signal from the temperature gage 20 or 20' and calculates the required metering mass, establishes the difference, based on a target/actual comparison, between the calculated target value and the actual value determined by means of a flow measurement, and controls the pump 16 or 16' in accordance with said difference.

When the metering quantities have been set correctly, the valves 24 and 24' are closed and, at the same time, the valves 23 and 23' are opened. Metered quantities of component then flow into the mixer 21 and are processed there to form a stoichiometrically defined reactive casting resin compound. Since, during the entire conveying and metering operation, the starting components 2, 2' rest on the constantly moving diaphragms 3, 3', sedimentation of abrasive filler materials in the starting components is reliably avoided.

Depending on the purpose of application, the casting resin compound is cured in a volume while the pressure is maintained. Any shrinkage of the casting resin compound in the volume which may occur during curing is compensated by casting resin compound which is continuously fed in as a result of the pressure constantly acting in the pressure vessels 1, 1'. In order, in this case, to avoid any undesirably high increase in pressure, pressure values determined by the pressure gages 18, 18' are recorded in the controller/regulator and are used to control a continuous casting plant arranged downstream of the mixer. If the pressures exceed prescribed initial threshold values, the conveying speeds of the pumps 16 and 16' are reduced in order to allow the starting components 2, 2' to be fed in at reduced metering quantities. If the pressure exceeds a second threshold value in one of the two pressure vessels 1, 1', despite maximum reduction in the conveying velocity, the pumps 16, 16' are switched off.

The flexible diaphragms 3, 3' do not need to accommodate great pressure differences. The pressure vessels can therefore be dimensioned to be very large and, depending on the application, may each have a capacity of 50 liters or more. The comparatively highly loaded valves 9, 9', 23, 23', 24 and 24' therefore only need to perform relatively few switching operations. It is therefore quite adequate for them to have switching times of 0.1 to 1 s. The valves can therefore be designed as slowly switching valves with double seals. Such valves are distinguished by an extremely long service life and being largely maintenance-free.

When the major portion of the starting components 2, 2' has emerged from the part-volumes 4, 4', the pumps 16, 16' are switched off and the valves 23, 23' are closed. By applying a vacuum to the evacuable vessels 13, 13' and, if appropriate, overpressure to the supply vessels 7, 7', the pressure vessels 1, 1' are then rapidly loaded again with fresh starting component 2, 2'.

In the device illustrated in FIG. 2, in contrast to the device according to FIG. 1, the pressure vessels 1, 1' have a diaphragm 3, 3' disposed almost vertically. In this device, the components 2, 2' therefore rest essentially near to the diaphragms 3, 3'. Nevertheless, the movements of the diaphragms are sufficient to largely avoid sedimentation of filler materials provided in the components 2, 2'. At the same time, in contrast to the device according to FIG. 2, the volume of the fluid flow conveyed through the pump 16 or 16' is also measured and controlled. A flow meter 26 or 26' is arranged downstream of the pump 16 or 16'. As an alternative or in addition, the pump 16 or 16' may be designed as a metering pump.

In this embodiment, it is possible, in addition or as an alternative to the mass metering according to the embodiment illustrated in FIG. 1 with the flow meter 22 or 22', to achieve indirect metering of the component 2 or 2'. In this case, metered volumes of fluid are pumped into the part-volume 5 or 5' and displace appropriate quantities of component 2 or 2' out of the pressure vessel 1 or 1'.

As mentioned in the device according to FIG. 1, in this device, the masses of starting component 2, 2' conveyed into the part-volumes 5 and 5' per unit of time can also be determined, initially with the valves 24 and 24' open, and can be changed, if appropriate, by adapting the conveying capacity of the pumps 16 and 16' via the controller/regulator 25. Furthermore, the flow meters 26 and 26' allow the metered quantities of component to be monitored constantly during the entire metering operation. By monitoring the temperature of the fluid using the temperature gage 19 or 19', temperature-related changes in the conveying stroke of the pump 16 or 16' can be corrected.

As mentioned, the metering can be achieved by changing the conveying capacity of the pump 16 or 16'. If the pump 16 or 16' is designed as a metering pump, the conveying capacity and thus the metering quantity are determined directly on the pump. This can be recorded in a reciprocating pump performing metering strokes or in a continuously operating gear pump in a particularly advantageous manner by means of a sensor, such as, in particular, an increment transmitter, which detects the stroke and/or the rotational speed of the metering pump, and can be controlled by the controller/regulator 25. In addition, the flow meter 26 or 26' controls the volume of the fluid metered by the pump 16 or 16', for example by counting. If the pump 16 or 16' is not a metering pump, the flow meter 26 or 261' determines the volume of the fluid conveyed into the part-volume 5 or 5'. In this case, the quantity of the flowing fluid can also be metered by means of the controller/regulator 25.

The pressure gages 18, 18' detect any leakage losses from the pressure vessels 1, 1' which may occur. A characteristic curve defining the pressure loss per unit of time for the pressure vessel 1 or 1' is stored in the controller/regulator 25. After comparison with the pressure value determined by the assigned pressure gage 18 or 18', the leakage loss can be compensated, if appropriate, by changing the conveying capacity of the pump 16 or 16' in a suitable manner.

Obviously, numerous modifications and variations of the present invention are possible in light of the above teachings. It is therefore to be understood that within the scope of the appended claims, the invention may be practiced otherwise than as specifically described herein.

| LIST OF DESIGNATIONS | |
| --- | --- |
| 1, 1' | Pressure vessels |
| 2, 2' | Starting components |
| 3, 3' | Diaphragms |
| 4, 4', 5, 5' | Part-volumes |
| 6, 6' | Inlets |
| 7, 7' | Supply vessels |
| 8, 8' | Agitators |
| 9, 9' | Valves |
| 10 | Vacuum pump |
| 11, 11', 12, 12' | Valves |

LIST OF DESIGNATIONS

| | |
|---|---|
| 13, 13' | Evacuable vessels |
| 14, 14' | Valves |
| 15, 15' | Openings |
| 16, 16' | Pumps |
| 17, 17', 18, 18' | Pressure gages |
| 19, 19', 20, 20' | Temperature gages |
| 21 | Mixer |
| 22, 22' | Flow meters |
| 23, 23', 24, 24' | Valves |
| 25 | Controller/regulator |
| 26, 26' | Flow meters |

What is claimed as new and desired to be secured by Letters Patent of the United States is:

1. A device for conveying metered quantities of at least two free-flowing components, at least one of which contains abrasive substances, into a mixer which serves to form a reactive compound from the metered quantities of the components, comprising: at least two metering devices which each have at least one pressure vessel formed by two shells which are curved in opposite directions, the pressure vessels each being subdivided by a flexible diaphragm clamped between the two shells into a first part-volume and a second part-volume, the diaphragm being moved without inadmissible overstretching during a filling against the curvature of a first one and during metering against the curvature of a second one of the two shells, the first part-volume which receives the abrasive component being arranged vertically above the second part-volume, the first part volume in each case receives one of the starting components and the second part-volume is acted upon by a metering means in form of an incompressible fluid and is configured to be connected to an evacuable vessel, wherein the pressure vessel which receives the abrasive component is designed and arranged in such a way that the major portion of the abrasive component fed into its first part-volume rests on the flexible diaphragm.

2. The device as claimed in claim 1, wherein the pressure vessel is designed to be essentially spherical.

3. The device as claimed in claim 1 wherein the evacuable vessel is connected to a pressure gage to determine any overpressure prevailing in the evacuable vessel during metering.

4. The device as claimed in claim 3, wherein the evacuable vessel has a first opening, which is connected to a vacuum pump, and is at least partially filled with the incompressible fluid below the first opening.

5. The device as claimed in claim 3, wherein the pressure vessel is fitted onto the evacuable vessel.

6. The device as claimed in claim 5, wherein the evacuable vessel surrounds a valve arranged in the bottom of the pressure vessel.

7. The device as claimed in claim 4 wherein a second opening is provided in the bottom of the evacuable vessel, which second opening is operatively connected to an intake nozzle of a pump which conveys the incompressible fluid into the second-part of the pressure vessel.

8. The device as claimed in claim 7, wherein a flow meter is arranged in the conveying path of the component between the first part-volume of the pressure vessel and the mixer.

9. The device as claimed in claim 8, wherein a first temperature gage which determines the temperature of the component is arranged in the conveying path of the component.

10. The device as claimed in claim 7, wherein a flow meter is arranged downstream of the pump.

11. The device as claimed in claim 7, wherein the pump is designed as a metering pump.

12. The device as claimed in claim 7, wherein a pressure gage is arranged on the second part-volume of the pressure vessel.

13. The device as claimed in claim 9, wherein a second temperature gage is arranged on the evacuable vessel.

14. The device as claimed in claim 1, wherein valves provided in the conveying path of the component have switching times which lie between 0.1 s and 1 s.

* * * * *